Dec. 10, 1968  E. A. BLACKHAWK ET AL  3,415,272

CHECK VALVE

Filed June 7, 1965

INVENTOR
EDWARD A. BLACKHAWK
DREW E. MOORE
BY
John H. Widdowson
ATTORNEY

United States Patent Office 3,415,272
Patented Dec. 10, 1968

3,415,272
CHECK VALVE
Edward A. Blackhawk, Box 1232, Bartlesville, Okla.
74003, and Drew E. Moore, 530 N. Cherry, Ottawa, Kans. 66067
Filed June 7, 1965, Ser. No. 461,746
1 Claim. (Cl. 137—516.13)

ABSTRACT OF THE DISCLOSURE

A check valve is provided having a fibrous heat resistant gasket valve cooperating with helical spring means which maintain said gasket valve under compression. The fluid passing through the valve is under pressure and lifts the gasket against the spring pressure thus allowing passage of fluid through the valve in only one direction.

Figure 1:
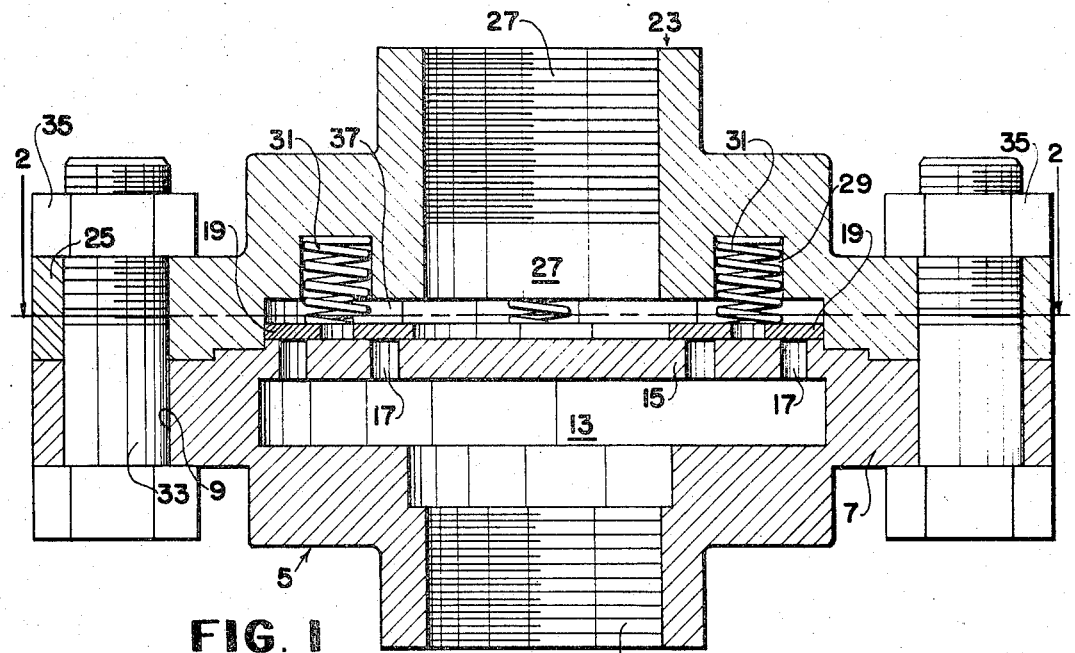

This invention relates to a new check valve, more particularly a check valve that has a gasket valve operator engaging a valve seat, and still more particularly a check valve that has a gasket valve operator engaging a valve seat especially adapted for use with a gaseous fluid compressor.

Check valves particularly designed for use with a compressor are well known. These valves retain gaseous fluid pressure in a line, storage tank, or the like, while a reciprocating piston of the compressor is on its downward or intake stroke. In such usage, due to compressing the gas, it is necessary for a valve of this type to function at high speeds and at high temperatures, and as a result they are subjected to extraordinary wear on any moving part. Many valves common to the art have a metal disc that engages a valve seat also made of metal. This metal to metal contact made under pressure and high temperature causes wear on either or both the valve seat and the metal disc, depending on the comparative hardness of the metal used in their construction. Other of such valves are so constructed that the flow of gaseous fluid is restricted by the action of the valve thus reducing the efficiency of the compressor.

We have invented a check valve that has a valve seat, in a housing means, and with a gasket means engaging the valve seat to close the valve. The new valve of our invention is constructed and adapted to pass fluid through the valve in one direction only.

The new check valve that we invented overcomes the difficulties encountered in the use of the check valves presently known. To overcome the difficulties of excessive wear on the parts subjected to movement, our invention provides a gasket instead of a metal clapper type disc to close the valve when pressure is exerted on the outlet side. By the use of this gasket, most of the wear is experienced on the gasket, which is easily and cheaply replaceable, instead of the valve seat. The heat resistant qualities of the preferred gasket material used in our check valve gasket keep this gasket from rapid deterioration under the heat conditions caused by the compression of gaseous fluids in a compressor, whereas heated metals are not adapted to withstand the rapid flexing and pounding of the operator against the valve seat under high temperatures. The comparatively light spring action exerted on the gasket in our preferred check valve assures a quick acting and positive seal. Since our preferred gasket is made of a more pliable material than metal, it more effectively seals the valve during its entire use.

Our new invention provides a check valve that allows passage of fluid through it by holes in the valve seat which are sealed when the gasket engages the valve seat. These holes can have a total cross sectional flow area greater than the cross section area of the intake and/or discharge passageways. Due to this arrangement, frictional loss within the valve is held to a minimum. If, however, it is desired to restrict the flow of fluid through the valve, and create a pressure drop, fewer holes can be provided. It thus become apparent that the check valve that we have invented is most versatile and can be readily adapted to many uses such as the loading and unloading of liquified petroleum gases where it could be reversed and used as a suction valve as well as a check valve.

It is an object of this invention to provide a new check valve.

It is another object of this invention to provide a new check valve particularly adapted for use with a gas compressor.

It is a further object of this invention to provide a new check valve having a gasket engaging the valve seat thereof.

It is another object of this invention to provide a new check valve that minimizes fluid pressure loss.

It is still another object of this invention to provide a new check valve that is long lasting and wear resistant.

Yet another object of this invention is to provide a new check valve that has a comparatively inexpensive replaceable valve part.

One more object of this invention is to provide a valve that is readily adaptable to use as a check valve or a suction valve.

Still another object of this invention is to provide a check valve for use in connection with a compressor of gaseous fluids that is heat resistant.

Yet another object of this invention is to provide a new spring loaded check valve having a gasket engaging the valve seat.

Various other objects, advantages, and features of the invention will become apparent to those skilled in the art from reading this disclosure.

Drawings accompany and are a part of this disclosure. These drawings depict preferred specific embodiments of the check valve of the invention, and it is to be understood that these drawings are not to unduly limit the scope of the invention. In the drawings, FIG. 1 is a longitudinal view in cross section of a preferred specific embodiment of the new check valve of our invention.

Figure 2:
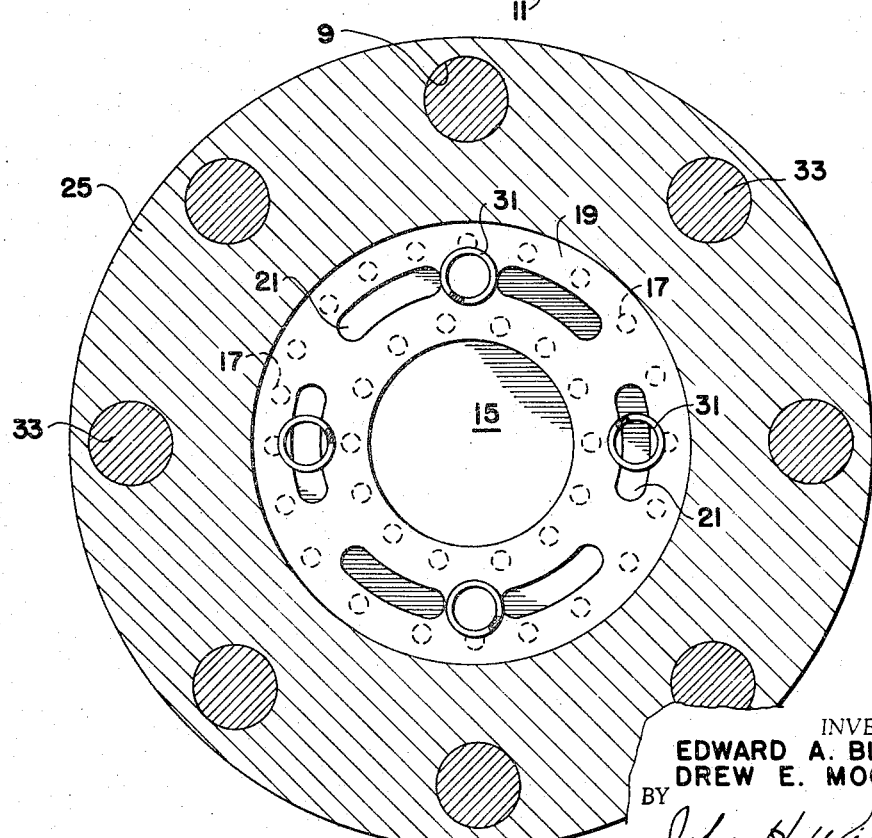

FIG. 2 is a view taken along line 2—2 of FIG. 1.

In the following is a discussion and description of our invention made with reference to the drawings whereon the same reference numerals are used to indicate the same or similar parts and/or structure. The discussion and description is of preferred specific embodiments of the new check valve of the invention, and is to be understood that the discussion and description is not to unduly limit the scope of the invention.

Referring now to the drawings in detail, FIG. 1 shows a preferred specific embodiment of our invention which has a flanged inlet member 5. An outer annular flange portion 7 of the inlet member 5 has a plurality of concentrically spaced bolt holes preferably drilled therein.

These bolt holes can be of any suitable number to rigidly secure the valve members together. It has been found in practice that eight bolts and bolt holes are satisfactory in high pressure service. An internally threaded fluid passageway 11 along the axis and in one end portion of the inlet member 5 intercommunicates with a fluid chamber 13. On the other end portion of the inlet member 5 is a valve seat 15. The outer surface of the valve seat 15 is preferably machine to a smooth flat surface. Fluid holes 17 are preferably drilled in two concentric circular rows in the valve seat. Any suitable number of fluid passageways are drilled, and to prevent pressure drop through the valve preferably in number that have a cross sectional area greater than the cross sectional area of the inlet fluid passageway 11. However, fewer holes can be used, if it is desirable to restrict the flow of fluids through the valve.

A ring-shaped gasket or valve operator 19 covers the fluid holes 17 on the valve seat 15. The outside diameter of the gasket 19 is substantially the same as the diameter of the valve seat 15, allowing sufficient clearance, however, for the gasket 19 to move freely away from the valve seat 15. The inside diameter of the gasket 19 is preferably substantially the same as the inside diameter of the inlet passagway 11. This last-named dimension is not critical, but should be of such size so as not to restrict the flow of fluid through the valve, but small enough to adequately cover and seal the fluid holes 17. A plurality of arcuate slots 21 are concentrically spaced within the gasket 19. These slots 21 provide for more efficient passage of fliud especially at the moment the gasket 19 disengages the valve seat 15. The slots 21 are spaced at a mid point between the concentrically spaced rows of fluid holes 17 when the gasket is in place on the valve seat 15. This gasket 19 can be made of any suitable fibrous or heat resistant material, such as asbestor fiberboard, preferably a so-called "hardboard" of relatively medium density.

A flanged outlet member referred to generally at 23 has an outer flange 25 with bolt holes 9 spaced to coincide with the bolt holes 9 in the annular flange 7 of the inlet member 5. A substantially threaded fluid passageway 27 extends axially through the outlet member 23. At least three spaced recesses 29 are positioned around the outlet passageway 27. A helical spring 31 which acts in compression is mounted in each recess 29. The springs 31 can be of any suitable type, but it has been found that a tapered or volute helical spring 31 gives long service in use since the individual coils do not engage each other during compression in the valve. The mounting of the springs 31 in the recesses 29 also keep the springs 31 from ever being subjected to full compression when in use, thus substantially increasing the effective usable life of the springs 31. These springs 31 are of sufficient length that when mounted in the recess 29, an end of the spring 31 protrudes and engages the surface of the gasket 19 when the inlet 5 and outlet 23 members are mounted together.

The inlet 5 and outlet 23 members are mounted together by bolts 33 inserted in holes 9 and secured by nuts 35. When the members are mounted together they form a gasket chamber 37. This gasket chamber 37 can be of any suitable size. It has been found in practice, however, that an optimum distance between the face of the gasket 19 when in place on the seat 15 and the inner surface of the outlet member 23 is a distance between ⅜ and ⅝ an inch and preferably approximately ½ of an inch where the gasket thickness is approximately ⅛ inch.

Although the foregoing description of a specific embodiment of our invention relates most particularly to a valve to be used in connection with gaseous fluids from a compressor, this by no means limits the uses of the invention to this particular use. The valve can be used as a check valve in a system where there are pressure differentials, and it is desirable to allow the liquid or gaseous fluids to flow in one direction only.

In operation, fluids under pressure enter the valve through the inlet passageway 11, into and through the fluid chamber 13, and into the fluid holes 17. When the pressure of the fluid is sufficiently great to raise the gasket 19 from the valve seat 15 against the pressure of the springs 31, the fluid passes through the fluid holes 17 into the gasket chamber 37, part of the fluid passing through slots 31 in the gasket 19 and the remainder passing between the gasket 19 and the valve seat 15. The fluid then passes through the outlet passageway 27 and out to a discharge line or the like. When the pressure on the intake side of the valve is only slightly greater than the pressure on the outlet side, the gasket 19 engages the valve seat 15 by the action of the compression springs 31 not allowing any fluid from the outlet side to enter the inlet side of the valve. This spring action increases the efficiency of the valve over one which employs only back pressure to check the return flow of fluid.

The materials preferably used in the construction of our check valve are metal with the exception of the gasket 19 as hereinbefore noted. The metals are preferably of iron and steel selected according to accepted machine shop and manufacturing practices common to the art. This is to by no means unduly limit the kinds of materials that can be used in the manufacture of our valve, as it can be made of other metal, plastics or any other hard substance.

The foregoing discussion and description has been made in connection with preferred specific embodiments of the check valve of the invention. However, it is to be understood that the discussion and description is only intended to illustrate and teach those skilled in the art how to practice the invention, and such is not to unduly limit the scope of the invention, which is defined in the claim set forth hereinafter.

We claim:

1. A check valve comprising, an inlet member, an abestos fiberboard gasket valve operator, and an outlet member, said inlet member having an outer annular flange, a plurality of spaced bolt holes through said flange, an internally threaded circular inlet fluid passageway along the axis and in one end portion of said inlet member, said fluid passageway intercommunicating with a fluid chamber within said inlet member, a circular valve seat surface on the other end portion of said inlet member, two concentric spaced rows of spaced fluid holes having a total cross sectional flow area greater than the cross sectional area of said fluid passageway positioned in said valve seat surface, and said spaced fluid holes intercommunicating with the said fluid chamber, said gasket being ring-shaped and having an outside diameter the same as the diameter of the said valve seat surface, and an inside diameter nearly the same as the inside diameter of the said fluid passageway, and having a plurality of circumferentially spaced arcuate slots therein, and said gasket movably mounted on said flat surface adapted to cover said fluid holes when said valve is in closed position, said outlet member having an outer annular flange, a plurality of spaced bolt holes through said flange, and said last-named bolt holes spaced in the same manner as the first-named bolt holes of the said inlet member flange, said outlet member having a circular internal substantially threaded fluid passageway along its axis and through same, a plurality of spaced recesses positioned around said outlet passageway tapered, a helical spring mounted in each of said recesses, said springs projecting from said recesses and engaging the said gasket under compression, said inlet and outlet members mounted together by bolts in said bolt holes and nuts threadedly mounted on said bolts, a gasket chamber between said members when so mounted, said valve constructed and adapted to pass fluid under pressure through said inlet fluid passageway into said fluid chamber and through said fluid chamber and into and through said fluid holes, into said gasket chamber and through same, and into and out of said outlet passageway, in operation the said fluid under pressure lifting the said gasket against the spring pressure allowing passage of fluid through said valve in one direction only.

References Cited

UNITED STATES PATENTS

| 1,909,480 | 5/1933 | Wilson | 251—368 XR |
| 957,012 | 5/1910 | Stone | 137—516.13 |
| 1,695,069 | 12/1920 | Tuttle | 137—516.13 |
| 1,909,974 | 5/1933 | Longacre | 137—516.13 |

FOREIGN PATENTS 532,178  8/1939  Great Britain.

WILLIAM F. O'DEA, *Primary Examiner.*

W. H. WRIGHT, *Assistant Examiner.*

U.S. Cl. X.R.

137—512.1, 516.15; 251—368